United States Patent
Kröselberg

(10) Patent No.: US 10,698,676 B2
(45) Date of Patent: Jun. 30, 2020

(54) INCREASING THE RELIABILITY OF SOFTWARE

(71) Applicant: SIEMENS AKTIENGESELLSCHAFT, München (DE)

(72) Inventor: Dirk Kröselberg, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/754,302

(22) PCT Filed: Sep. 11, 2015

(86) PCT No.: PCT/EP2015/070860
§ 371 (c)(1),
(2) Date: Feb. 22, 2018

(87) PCT Pub. No.: WO2017/041860
PCT Pub. Date: Mar. 16, 2017

(65) Prior Publication Data
US 2018/0253295 A1   Sep. 6, 2018

(51) Int. Cl.
*G06F 8/65*   (2018.01)
*G06F 11/00*   (2006.01)
*G06F 21/57*   (2013.01)

(52) U.S. Cl.
CPC .............. *G06F 8/65* (2013.01); *G06F 11/008* (2013.01); *G06F 21/57* (2013.01); *G06F 2221/033* (2013.01)

(58) Field of Classification Search
CPC . G06F 8/65; G06F 8/70; G06F 11/008; G06F 11/3604; G06F 16/24578; G06F 21/57; G06F 2221/033; G06F 8/71
USPC .................................................. 717/168–178
See application file for complete search history.

(56) References Cited

U.S. PATENT DOCUMENTS

| | | | | |
|---|---|---|---|---|
| 7,020,875 B2* | 3/2006 | Zweifel | ..................... | G06F 8/61 707/999.003 |
| 7,886,200 B1* | 2/2011 | Hernacki | .............. | G06F 11/008 714/48 |
| 8,578,363 B2* | 11/2013 | Sah | .......................... | G06F 8/65 717/169 |
| 9,038,051 B1* | 5/2015 | Zweifel | ..................... | G06F 8/65 717/169 |
| 10,019,255 B1* | 7/2018 | Greenfield | ................ | G06F 8/65 |

(Continued)

OTHER PUBLICATIONS

IBM: "z/OS Planning for Installation—Version 2 Release 1—GA32-0890-02"; pp. 1-199; XP055256605.

(Continued)

*Primary Examiner* — Marina Lee
(74) *Attorney, Agent, or Firm* — Schmeiser, Olsen & Watts LLP

(57) ABSTRACT

Provided are methods and to-devices for increasing the reliability of a software by applying a patch to the software, wherein the application of the patch is performed if a specifiable reliability status is indicated by reliability information associated with the patch, wherein an indicator for successful increasing of the reliability of the software by application of the patch is represented by the reliability information. The methods and devices can be used for the maintenance of industrial installations.

9 Claims, 1 Drawing Sheet

(56) References Cited

U.S. PATENT DOCUMENTS

| | | | | |
|---|---|---|---|---|
| 2003/0033597 A1* | 2/2003 | Allsop | ............ | G06F 8/61 |
| | | | | 717/169 |
| 2006/0101457 A1* | 5/2006 | Zweifel | ............ | G06F 8/65 |
| | | | | 717/174 |
| 2007/0261047 A1* | 11/2007 | Sah | ............ | G06F 8/65 |
| | | | | 717/168 |
| 2010/0058317 A1* | 3/2010 | Braams | ............ | G06F 21/572 |
| | | | | 717/171 |
| 2013/0055228 A1* | 2/2013 | Song | ............ | G06F 8/654 |
| | | | | 717/168 |
| 2013/0246849 A1* | 9/2013 | Plamondon | ............ | G06F 11/3688 |
| | | | | 714/27 |
| 2014/0173586 A1* | 6/2014 | Dugan | ............ | G06F 8/65 |
| | | | | 717/173 |
| 2014/0237462 A1* | 8/2014 | Zheng | ............ | G06F 8/62 |
| | | | | 717/170 |
| 2018/0253295 A1* | 9/2018 | Kroselberg | ............ | G06F 8/65 |

OTHER PUBLICATIONS

PCT International Search Report and Written Opinion of International Searching Authority dated Mar. 17, 2016 corresponding to PCT International Application No. PCT/EP2015/070860 filed Sep. 11, 2015.

* cited by examiner

INCREASING THE RELIABILITY OF SOFTWARE

CROSS-REFERENCE TO RELATED APPLICATIONS

This application claims priority to PCT Application No. PCT/EP015/070860, having a filing date of Sep. 11, 2015, the entire contents of which are hereby incorporated by reference.

FIELD OF TECHNOLOGY

The following relates to a method and apparatus to increase the reliability of software using a patch.

BACKGROUND

Modern consumer products, such as smartphones or tablets, currently have a short life span of 1 to 3 years on average. Due to ever shorter product cycles, which affect both hardware and software, products of this kind are more susceptible to errors than previously, for example, due to shorter test phases. In addition, cyber attacks based on viruses or Trojans are becoming increasingly common.

As a result it is now commonplace for corrections to be needed, mainly to software but occasionally also to firmware, a process which is performed by means of correction software, referred to in the following as patches. This is a reliable means of correcting security vulnerabilities and programming errors.

The "patching" of consumer products represents the current state of the art, but in industrial installations, patching is seldom used. The patching of software in industrial installations often relates to critical infrastructure components, and there are already legal requirements in place to maintain such installations up to date from a security point of view, in other words, to equip them with the latest patches. However, these patches cannot always be easily installed, because boundary conditions of the respective industrial plant, such as real-time functionality or the configurations of the industrial plant, must be taken into account.

SUMMARY

An aspect relates to specify methods and devices, which enable a correction of software by means of a patch, in particular in industrial plants, in a simple, reliable and automatic manner.

The following relates to a method for increasing the reliability of software by applying a patch to the software, characterized in that the application of the patch is performed if a specifiable reliability status is indicated by means of reliability information associated with the patch, wherein the reliability information represents an indicator of a successful increase in the reliability of the software by applying the patch.

One advantage of embodiments of the invention lies in the fact that the reliability information represents an indicator of a successful increase in the reliability of the software by applying the patch, which means that it can also be automatically decided whether or not the patch should be applied to the software. This decision can be made depending on an expected level of harm in the event of an unsuccessful update of the software. If the software is, for example, a control component that relates to an entire low-voltage network of an electricity supplier, then the reliability status can be assigned a higher value than if the software is part of a control system of a local electric car charging station. Therefore, a further advantage of embodiments of the invention lies in the fact that the specifiable reliability status is set in accordance with the consequential damage due to an unsuccessful patching of the software and/or depending on damage to the existing software from non-execution of the patch, and depending on the result of a comparison of the specifiable reliability status and the reliability of the information the patching is either performed or not. A particular advantage of embodiments of the invention lies in the fact that the reliability information is changed in accordance with a number of tests already carried out by other operators and/or manufacturers, and therefore a risk of failure of the application of the patch can be determined even before the application to the software. This enables costs related to a failed patching process to be significantly reduced. Furthermore, a manual intervention in applying the patch can be reduced, because depending on the level of the reliability information the patching can be performed automatically. As a result, a more cost-effective solution for applying the patch will be implemented than in current solutions.

Patches are parts of a software system, for example in the form of libraries, which are either used instead of existing software parts of the current software and/or to complement existing software components.

In an extension of embodiments of the invention, if the application of the patch has effected a successful increase in the reliability of the software, the reliability information is changed in such a way that the reliability information represents the successful increase in the reliability of the software. Thus, the reliability information reflects the degree to which the patch has been tested or used successfully. Therefore, a number of users can contribute to communicating an indicator of the reliability of applying the patch to other users.

In an alternative or as an extension to this aspect, if the application of the patch has effected an unsuccessful increase in the reliability of the software, then the reliability information is changed in such a way that the reliability information represents the unsuccessful increase in the reliability of the software. Thus, the information related to the reliability of applying a patch is also influenced by unsuccessful tests.

In a specific embodiment of the invention, to change the reliability information a size of the change in the reliability information is adjusted depending on at least one of the following parameters:
(a) a manufacturer of the software performs a check of whether the reliability of the software is increased or decreased by applying the patch;
(b) a manufacturer of an operating system, on which the software is executed, performs a check of whether the reliability of the software is increased or decreased by applying the patch;
(c) a manufacturer of the hardware, on which the software is executed, performs a check of whether the reliability of the software is increased or decreased by applying the patch;
(d) an operator of a plant, who executes the software on said plant, performs a check of whether the reliability of the software is increased or decreased by applying the patch.

One advantage of this embodiment of the invention is that the reliability of the reliability information is enhanced.

In a further extension of embodiments of the invention, a size of the change in the reliability information is greater in the case of an unsuccessful increase in the reliability of the software than in the case of a successful increase in the reliability of the software. This approach is particularly advantageous, since an unsuccessful increase in the reliability becomes noticeable more quickly due to the greater change in the reliability information than in the case of a successful increase, and therefore provides an early warning of potential risks in any potential future application of the patch.

In a preferred embodiment of the invention, the reliability information is described by a single number or by a multi-dimensional vector space, wherein each dimension of the multi-dimensional vector space represents at least one specifiable configuration consisting of one hardware component and/or one software component, and the software is executed on the configuration. This arrangement enables the reliability information to be implemented in a simple but effective way.

In an advantageous development of embodiments of the invention, the patch can be implemented by at least one of the following alternatives:
a) the patch is configured in the form of an executable code fragment, in particular a library, and in applying the patch to the software a code fragment of the software is replaced by the executable code fragment;
b) the patch is configured in the form of a configuration change of the software, in particular to increase an IT security level, and in applying the patch a configuration of the software is modified by the configuration change.

This allows embodiments of the invention to be used specifically and very effectively in different fields of application.

The following also relates to a device for increasing the reliability of software by applying a patch to the software, characterized by
a first unit for performing the application of the patch if a specifiable reliability status is indicated by comparison by means of reliability information associated with the patch, wherein an indicator of a successful increase in the reliability of the software by applying the patch (PAT) is represented by the reliability information, a second unit for determining a comparison of the associated reliability information with the specifiable reliability status.

The device can also have a third unit, which is configured in such a way that one or more steps of the method of embodiments of the invention can be implemented and executed therewith.

The device and its extension have the same advantages as the corresponding method steps.

BRIEF DESCRIPTION

Some of the embodiments will be described in detail, with references to the following figures, wherein like designations denote like members, wherein.

DETAILED DESCRIPTION

Figure 1:
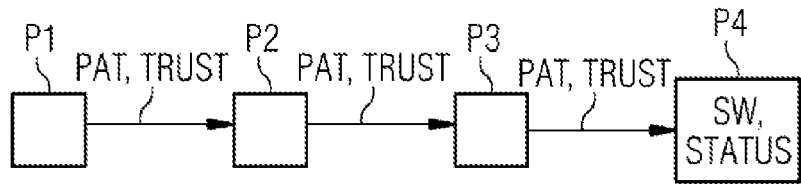
FIG. 1 depicts a cascaded generation of reliability information of a patch followed by verification of the reliability information for the correction of a piece of software, in accordance with embodiments of the present invention.

Elements having the same function and mode of operation are labelled with the same reference numeral in the figures.

In an exemplary embodiment according to FIG. 1, a control system for a conveyor belt of a bottling plant is corrected by means of a patch PAT. Patches are parts of a software system, for example in the form of libraries, which are used instead of existing software components of the current software. In this example, a correction of the "Conveyor belt control" software library is necessary, as a programming error for a specific speed of the conveyor belt has been found there. Therefore, there is a need to increase the reliability of the software SW because the known programming error reduces the reliability.

A software manufacturer P1 of the software SW first generates a revised library, which is to be installed in the local control system on the bottling plant in the form of a patch PAT. The software manufacturer tests the patch in its software environment and finds out that the correction of the software appears to be successful. This means that the reliability of the software SW could be increased by applying the patch PAT. For this reason, the manufacturer sets a reliability information item TRUST associated with the patch to a value of 1.

In general, the reliability information TRUST indicates how reliably, in other words with what probability, the application of the patch PAT can increase the reliability of the software. If it is found, for example, that after applying the patch the software exhibits a new error in the program flow, then the reliability of the software can either increase or decrease depending on the new error. If the application of the patch causes a system crash of the software, this reduces the reliability. However, if the programming error has been corrected and a warning light does not light correctly, then the installation itself can be operated without error so that the reliability increases, but does not assume a maximum value for the reliability.

In the present example, a low value for the reliability information means an uncertain prognosis as to whether the increase in the reliability can be achieved by applying the patch to the software, and a high value for the reliability information means that there is a high probability that installing the patch will increase the reliability of the software.

The software manufacturer P1 sends the patch together with the reliability information TRUST associated with it to the manufacturer of the operating system P2, on which the software is designed to run. In this example the operating system is a Linux variant. The operating system manufacturer P2 tests whether it can successfully apply the patch to increase the reliability of the software. If in the view of the manufacturer of the operating system P2 the patch was installed in the software successfully, i.e. the reliability or quality of the software was increased by the patch, then it increases the reliability information by a value of 1 to TRUST=2. In a subsequent step the manufacturer of the operating system transmits the patch PAT, together with the reliability information TRUST amended by him, to the plant manufacturer P3.

The plant manufacturer P3 tests whether the patch PAT can be successfully installed in the control system of the bottling plant and executed there. If after applying, i.e. after installing, the patch it is found that the software of the bottling plant relating to the conveyor belt control system is now operating without error again and no new malfunctions have appeared as a result of applying the patch, then the system manufacturer increases the reliability information TRUST by, for example, a value of 2 to TRUST=4. The plant manufacturer then sends the patch together with the associated reliability information TRUST amended by him to a plant operator P4, who will then install the patch in his system software.

The plant operator P4 would like only to install patches that satisfy a specifiable reliability status≥3. Therefore, the plant operator checks whether the transmitted reliability information TRUST is greater than or equal to the reliability status defined by him. Since in the following case the value of TRUST≥STATUS, the plant operator will subsequently update the plant software using the patch PAT and correct the error in the conveyor belt control system.

At this point, the software in the bottling plant has been corrected with the patch. If the correction has been successfully performed, i.e. the known error has been corrected and the updated, i.e. patched, software of the plant otherwise operates error-free, then the plant operator can also further increase the reliability information, so that other companies that want to correct their software by means of the patch can obtain more reliable reliability information TRUST.

The following can thus not only be used by the manufacturers of individual components of a plant but also by the plant operator himself to exchange mutual information on the reliability of patches. Thus, after successfully increasing the reliability of the software, the plant operator can send back to the plant supplier P3 the information that the correction of the software has been performed successfully, and that the plant manufacturer can subsequently send the patch to other plant operators with a higher, in other words greater, level of reliability information.

In the above exemplary embodiment, the patch is sent to one or more manufacturers or operators together with the associated reliability information. In an alternative extension of embodiments of the invention, the associated reliability information can also be transferred separately from the actual patch. Thus, it is possible only to transmit the associated reliability information initially and the manufacturer or operator can then decide whether to download the appropriate patch and install it in their software.

In a further embodiment, the respective manufacturer or operator only receives a notification that a new patch with an associated reliability information is available to download on a server. In this case, the manufacturer or operator can first download the associated reliability information TRUST and then, depending on the level of the associated reliability information, download the patch and install it in their software. Moreover, the associated reliability information, which the respective operator changes after applying the patch, can be sent back to the server, so that other operators and/or manufacturers can subsequently already obtain access to the revised associated reliability information.

In addition, the use of the patch and the associated reliability information need not be carried out sequentially according to FIG. 1, but can also be performed in a decentralized way, by the fact that the patch and the associated reliability information are available for downloading on the server and can be non-synchronously downloaded and tested, or installed in the respective software, by the manufacturers and/or operators.

In the above example, the reliability information TRUST would be increased on a successful increase in the reliability of the software within the supply chain, or within the plant operator. Similarly, in the event of a failed increase in the reliability of the software by applying the patch, for example as a result of new errors caused by the patch, the associated reliability information can also be reduced or reset to zero, so that companies downstream in the supply chain receive information that the patch may either not work or only partially work. In this example, in the event of a failed increase in the reliability of the software, the plant manufacturer P3 can set the reliability information of TRUST to 1 and inform the preceding suppliers in the supply chain, so that they, for example, withdraw the patch or else the software manufacturer P1 revises the patch once again.

The unsuccessful increase in the reliability of the software can also be due to the fact that different configurations are being used on one plant. If it is not clear why, for example in the case of one plant manufacturer the patch can be successfully installed in a plurality of plants and in a single plant, for example, the installation of the patch reduces the reliability of the software, then the plant manufacturer can still deliver the patch to his customers regardless, but in this case he will reduce the associated reliability information, so that the plant operator himself can decide whether or not to incur a risk of degrading the reliability of the software by the patch. Of course, the patch may relate to a very critical vulnerability within the control system, so that the plant operator may try to update the software with the patch even if a lower reliability information is associated with the patch.

In the examples above, an increased reliability, in other words a higher probability of a successful application of the patch or a lower risk that applying the patch will reduce the reliability of the software after patching, was regarded as having a higher value for the reliability information TRUST. Similarly, expressed conversely, a high value for the reliability information can represent a low probability of a successful increase in the reliability of the software after applying the patch, or a higher risk to the smooth operation of the software after installation of the patch.

In the context of embodiments of the invention, other representations of the reliability information are also allowed, wherein a unique association must exist, from which anyone who wants to update the software by means of the patch is able to identify whether the respective value of the reliability information reflects a probability of a successful or less successful increase in the reliability of the software.

Figure 2:
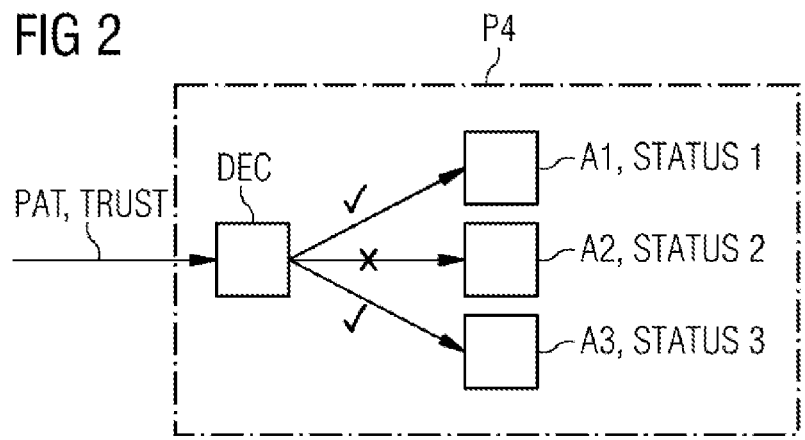
FIG. 2 depicts evaluation of the reliability information and reliability status during an application of a patch in different installations, in accordance with embodiments of the present invention.

In the present example, the approach to using a patch with the associated reliability information was presented by reference to a plant. According to FIG. 2, the patch together with the associated reliability information can be first sent to a decision module DEC, which, depending on the specifiable reliability statuses STATUS1, STATUS2, STATUS3 for each plant A1, A2, A3, can decide whether or not the software should be corrected by the patch for the respective plant A1, A2, A3. In the exemplary embodiment according to FIG. 2, the plants A1 and A3 are to be corrected with the patch, hence the ticks, but not the plant A2, hence the cross, because the plant A2 requires a higher reliability STATUS2 than is specified by the reliability information TRUST of the patch PAT currently being offered.

Figure 3:
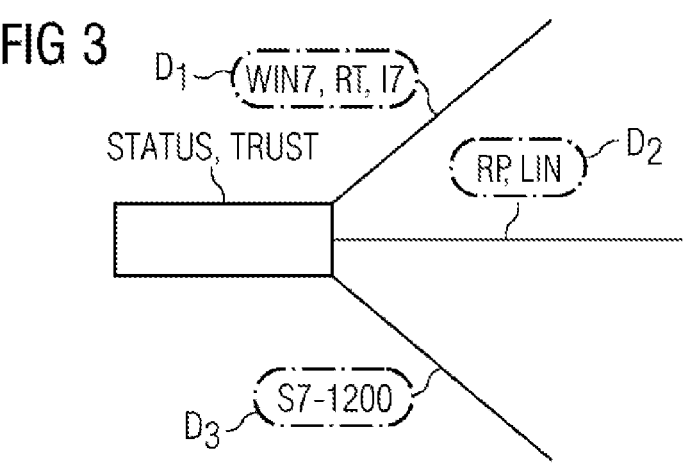
FIG. 3 depicts a use of reliability information with multiple dimensions, in accordance with embodiments of the present invention.

In the above examples, an exemplary value was formed as the reliability information for each particular patch. Patches are often formed for applications in which the application can run on different platforms. A classic example is a JAVA-implemented application, wherein JAVA can be implemented and executed both independently of the operating system and hardware-independently. As is apparent in FIG. 3, the reliability information TRUST and the reliability status STATUS can each be formed in a multi-dimensional space. Each dimension within the multi-dimensional space can represent a specific configuration, for which a specific value is generated. The dimensions in the present example according to FIG. 3 mean:

1st dimension: Windows 7 operating system, real-time system RT, Hardware: Intel Pentium 17
2nd dimension: Hardware: Raspberry Pi, operating system: Linux
3rd dimension: Hardware and operating system: Siemens Siematic S7-1200.

With each of these dimensions a value for the reliability information is associated, for example, the dimension D1=5, dimension D2=2 and dimension D3=8. Thus, depending on the specific configuration of the software to be corrected with the patch, the plant operator can seek the respective dimension that corresponds to his present configuration. This enables a further improvement in the reliability to be achieved when installing a patch for correcting the software. The reliability information with one or a plurality of dimensions can be represented using an XML description language (XML—Extensible Markup Language).

Figure 4:
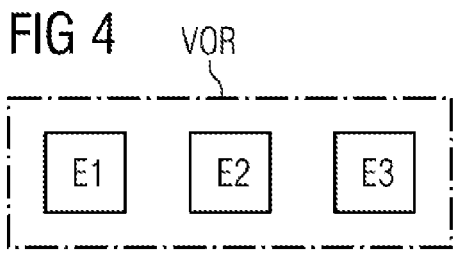
FIG. 4 depicts an embodiment of a device for increasing a reliability of software.

The following can be implemented by means of a device VOR, see FIG. 4. The device VOR has a first unit E1 for performing the application of the patch PAT, if a specifiable reliability status STATUS is indicated by comparison by means of reliability information TRUST associated with the patch PAT, wherein an indicator of a successful increase in the reliability of the software SW by applying the patch PAT is represented by the reliability information TRUST, and a second unit E2 for determining a comparison of the associated reliability information TRUST with the specifiable reliability status STATUS. In addition, the device can also have a third unit E3, which is configured in such a way that that one or more steps of the method according to one or more of the extensions of embodiments of the invention can be implemented and executed therewith.

The units E1-E3 can be implemented in software, hardware, or a combination of software and hardware. The units E1-E3 can be connected to each other via a bus. In addition, a processor, a memory module, input and/or output units for detecting or sending information or messages can also be connected to the bus.

The following can be applied in the industrial environment and in the consumer sector, for example, for maintaining manufacturing equipment in a production system, or control units of an electricity transmission network.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for increasing a reliability of software by applying a patch to the software, the method comprising:
receiving a reliability information of the patch, the reliability information of the patch representing an indicator of a successful increase in the reliability of the software, which is determined based on previous applications of the patch by a plurality of preceding suppliers in a supply chain, wherein the reliability information is adjusted after each application of the patch by a preceding supplier;
automatically applying the patch to correct the software if a specifiable reliability status indicated by means of the reliability information associated with the patch exceeds a threshold value of a reliability status based on an expected level of harm in an event of an unsuccessful update to the software, wherein the expected level of harm influences the threshold value of the reliability status.

2. The method as claimed in claim 1, wherein if the application of the patch has effected a successful increase in the reliability of the software, the reliability information is changed in such a way that the reliability information represents the successful increase in the reliability of the software and is transmitted to others in the supply chain.

3. The method as claimed in claim 1, wherein if the application of the patch has effected an unsuccessful increase in the reliability of the software, the reliability information is changed in such a way that the reliability information represents the unsuccessful increase in the reliability of the software and is transmitted to others in the supply chain.

4. The method as claimed in claim 2, wherein the previous applications of the patch by the plurality of preceding suppliers in the supply chain includes:
  (a) a manufacturer of the software performs a check of whether the reliability of the software is increased or decreased by applying the patch;
  (b) a manufacturer of an operating system, on which the software is executed, performs a check of whether the reliability of the software is increased or decreased by applying the patch;
  (c) a manufacturer of the hardware, on which the software is executed, performs a check of whether the reliability of the software is increased or decreased by applying the patch; and
  (d) an operator of a plant, who executes the software on the plant, performs a check of whether the reliability of the software is increased or decreased by applying the patch.

5. The method as claimed in claim 2, wherein a size of the change in the reliability information is greater in the case of an unsuccessful increase in the reliability of the software than in the case of a successful increase in the reliability of the software.

6. The method as claimed in claim 1, wherein the reliability information is described by a single number or by a multi-dimensional vector space, wherein each dimension of the multi-dimensional vector space represents at least one specifiable configuration consisting of a hardware component and/or a software component, and the software is executed on the configuration.

7. The method as claimed in claim 1, wherein the patch is configured in at least one of the following alternatives:
  c) the patch is configured in a form of an executable code fragment, and in applying the patch to the software a code fragment of the software is replaced by the executable code fragment; and
  d) the patch is configured in a form of a configuration change of the software to increase an IT security level, and in applying the patch a configuration of the software is modified by the configuration change.

8. A device for increasing the reliability of a software by applying a patch to the software, comprising:
a processor of the device, the processor configured to:
receive a reliability information of the patch, the reliability information of the patch representing an indicator of a successful increase in the reliability of the software, which is determined based on previous applications of the patch by a plurality of preceding suppliers in a supply chain, wherein the reliability information is adjusted after each application of the patch by a preceding supplier;

automatically perform an application of the patch to correct the software if a specifiable reliability status indicated by a comparison by means of reliability information associated with the patch exceeds a threshold reliability status, wherein an indicator of a successful increase in the reliability of the software by applying the patch is given by the reliability information; and compare the associated reliability information with the specifiable reliability status.

9. The device as claimed in claim 8, wherein the processor is further configured to change the reliability information if there has been a successful increase in reliability of the software or if there has been an unsuccessful increase in reliability of the software and to transmit the reliability information to others in the supply chain.

* * * * *